United States Patent [19]

Yoshino

[11] Patent Number: 5,319,356

[45] Date of Patent: Jun. 7, 1994

[54] APPARATUS FOR SURVEILLANCE OF BUS-BAR TEMPERATURE

[75] Inventor: Takeo Yoshino, Marugame, Japan

[73] Assignee: Mitsubishi Denki Kabushiki Kaisha, Tokyo, Japan

[21] Appl. No.: 921,949

[22] Filed: Jul. 30, 1992

[30] Foreign Application Priority Data

Aug. 1, 1991 [JP] Japan .................................. 3-60828

[51] Int. Cl.$^5$ ............................................. G08B 21/00
[52] U.S. Cl. ..................................... 340/584; 174/68.2; 174/70 B; 174/88 B; 340/635; 361/1
[58] Field of Search ............... 340/584, 635; 174/68.2, 174/70 B, 88 B; 361/1

[56] References Cited

U.S. PATENT DOCUMENTS

| | | | |
|---|---|---|---|
| 2,274,422 | 2/1942 | Mahoney et al. | 174/88 B |
| 4,901,060 | 2/1990 | Liu | 340/635 |
| 5,206,461 | 4/1993 | Genzel et al. | 174/70 B |

Primary Examiner—Glen R. Swann, III
Attorney, Agent, or Firm—Burns, Doane, Swecker & Mathis

[57] ABSTRACT

An apparatus for surveillance of bus-bar temperature. At least one insulative holder made of ceramics or a like high heat conductive material holds a bus-bar. A thermistor or a like temperature sensor contacts the insulative holder and a control device remote from the bus-bar compares an output signal of the temperature sensor with a predetermined reference value, or data of a characteristic curve, thereby judging whether or not an abnormal temperature rise occurs or will occur in near future.

2 Claims, 3 Drawing Sheets

APPARATUS FOR SURVEILLANCE OF BUS-BAR TEMPERATURE

BACKGROUND OF THE INVENTION

1. Field of the Invention

The present invention relates to an apparatus for surveillance of bus-bar temperature which surveys occurrence of a temperature rise at a connection part of the bus-bars in high-tension or low-tension parts of a switch board or a control board.

2. Description of the Prior Art

A conventional surveillance of temperature of bus-bar is described referring to FIG. 3. FIG. 3 is a perspective view showing the conventional surveillance of temperature of bus-bar. In FIG. 3, bus-bars 1 and 2 are electrically and mechanically connected via a connection bar 3 by screwbolts 4, washers 5 and nuts (which are not shown in the figure because they are well-known). The bus-bar 2 is fixed on an insulative holder 8 by a screwbolt 6, a washer 7 and a nut (not shown in the figure). Furthermore, the insulative holder 8 is fixed on a frame 11 by screwbolts 9, washers 10 and nuts (not shown in the figure). On each connection bar 3, a thermolabel 12 is adhered for detecting a temperature rise of the connection part of the bus-bar 1 and 2.

Generally, contact resistance of the connection part of the bus-bars 1 and 2 and connection plate 3 or the like may be increased due to corrosion of the surfaces of the bus-bar 1 and the connection plate 3 and/or the surfaces the bus-bar 2 and the connection plate 3 or loosening of the screwbolts 4. And thereby, the temperature of the connection parts (connection plate 3) of the bus-bars 1 and 2 may rise. When the temperature at the connection plate 3 rises, the color of the thermolabel 12 changes. When the change of the color of the thermolabel 12 is observed, the abnormal temperature rise at the connection part of the bus-bars 1 and 2 is detected.

In the above-mentioned conventional surveillance of the temperature of the bus-bars, since the abnormal temperature rise at the connection part of the bus-bars 1 and 2 is detected by the change of the color of the thermolabel 12, the occurrence of the abnormal temperature rise is confirmed ex post facto. Accordingly, occurrence of the abnormal temperature rise at the connection part of the bus-bars 1 and 2 can not be predicted in advance.

Furthermore, the connection part of the bus-bars 1 and 2 are covered by a housing, such as a security cover and so on. Thereby, for confirming the occurrence of the abnormal temperature rise, the cover or front panel of the housing must be taken off in a troublesome manner each time.

SUMMARY OF THE INVENTION

The purpose of the present invention is to solve the above-mentioned problems and to provide an apparatus for surveillance of bus-bar temperature which always surveys the temperature of the bus-bar, remotely.

An apparatus for surveillance of bus-bar temperature in accordance with the present invention comprises:

at least an insulative holder having an high heat conductivity and provided in the vicinity of each bus-bar for electrically insulatively supporting bus-bars;

a temperature sensor provided for contacting each insulative holder and outputting a signal corresponding to the temperature of the insulative holder; and a surveillance means provided remotely from the temperature sensor, receiving the signal from the temperature sensor and judging whether the signal is normal or not.

In the apparatus for surveillance of bus-bar temperature in accordance with the present invention configured above, when the contact resistance is increased due to the corrosion of the surfaces of the connection part of the bus-bars or due to the loosening of the screwbolts, heat generated by the increase of the contact resistance and the like is transmitted to the insulative holder of high heat conductivity (which is, for example, made of ceramics). As a result, the temperature of the insulative holder will be always substantially the same as that of the connection part of the bus-bars. The temperature sensor, such as a thermistor, outputs a signal responding to the temperature of the insulative holder. The surveillance means, such as a microcomputer, compares the signal from the temperature sensor with a predetermined reference value or reference data such as a predetermined characteristic curve. Thereby, the surveillance means judges whether or not an abnormal temperature rise has occurred at the connection part of the bus-bars, or whether or not an abnormal temperature rise will occur at the connection part of the bus-bars in the near future.

When the insulative holder and the temperature sensor are provided in each phase of the bus-bar, the phase or the position wherein the abnormal temperature rise has occurred or will occur can be specified.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF PREFERRED EMBODIMENTS

Figure 1:
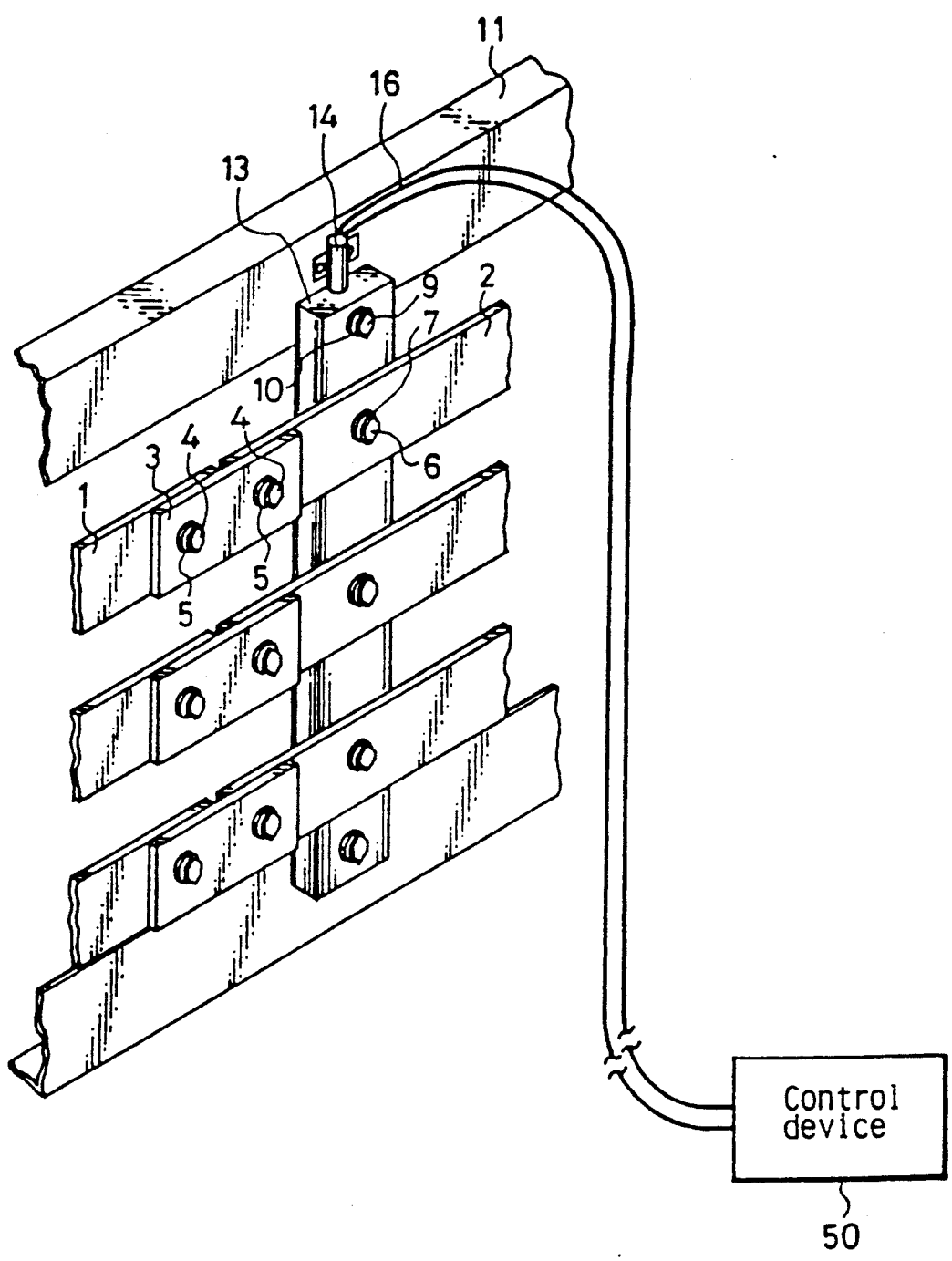
FIG. 1 is a perspective view showing a constitution of a first embodiment of an apparatus for surveillance of bus-bar temperature in accordance with the present invention.

A first preferred embodiment of an apparatus for surveillance of bus-bar temperature in accordance with the present invention is described referring to FIG. 1. FIG. 1 is a perspective view showing the constitution of the first embodiment.

In FIG. 1, bus-bars 1 and 2 for respective phases are electrically and mechanically connected via a connection plate 3 by screwbolts 4, washers 5 and nuts (not shown in the figure). Each bus-bar 2 is fixed on an insulative holder 13 by screwbolt 6, washer 7 and nut (not shown in the figure). The insulative holder 13 is fixed on a frame 11 by screwbolts 9, washers 10 and nuts (not shown in the figure). The insulative holder 13 is made of an insulative material having high heat conductivity such as ceramics. Plural, for example, three phases of the bus-bars 2 are held together on one insulative holder 13. A temperature sensor 14 is provided on the frame 11 in a manner so as to contact the insulative holder 13. The temperature sensor 14, which is, for example, a thermistor or the like, converts the temperature of the insulative holder 13 to an electric signal of a predetermined type corresponding to the temperature and outputs the electric signal. The temperature sensor 14 is connected to a control device 50 by lead wires 16. The control device 50 is provided remotely from the bus-bars 1 and 2 and comprises a microcomputer, memories and so on. In the control device 50, the signal from the temperature sensor 14 is compared with a reference value, or the change of the signal from the temperature sensor 14 is compared with data of a predetermined reference data of the characteristic curve stored in a memory.

When the contact resistance of the connection part of the bus-bars 1 and 2 increases due to the corrosion of the contact surfaces of the bus-bar 1 and the connection plate 3 and/or the contact surfaces of the bus-bar 2 and the connection plate 3 or the loosening of the screw-bolts, heat is generated at the connection part of the bus-bars 1 and 2. The heat is transmitted to the insulative holder 13. Hereupon, since the insulative holder 13 is made of a high heat conductive material such as ceramics, heat loss at the insulative holder 13 is very small. As a result, the temperature of the insulative holder 13 becomes, and hence can be regarded as, substantially the same as that of the connection part of the bus-bars 1 and 2. The temperature sensor 14 outputs the signal responding to the temperature of the insulative holder 13 via the lead wire 16 to the control device 50. The control device 50 compares the signal with the reference value or compares the change of the signal with the data of the predetermined characteristic curve stored in the memory. Thereby, the control device 50 judges whether an abnormal temperature rise has occurred at the connection part of the bus-bars 1 and 2, or judges whether an abnormal temperature rise will occur in the near future.

Figure 2:
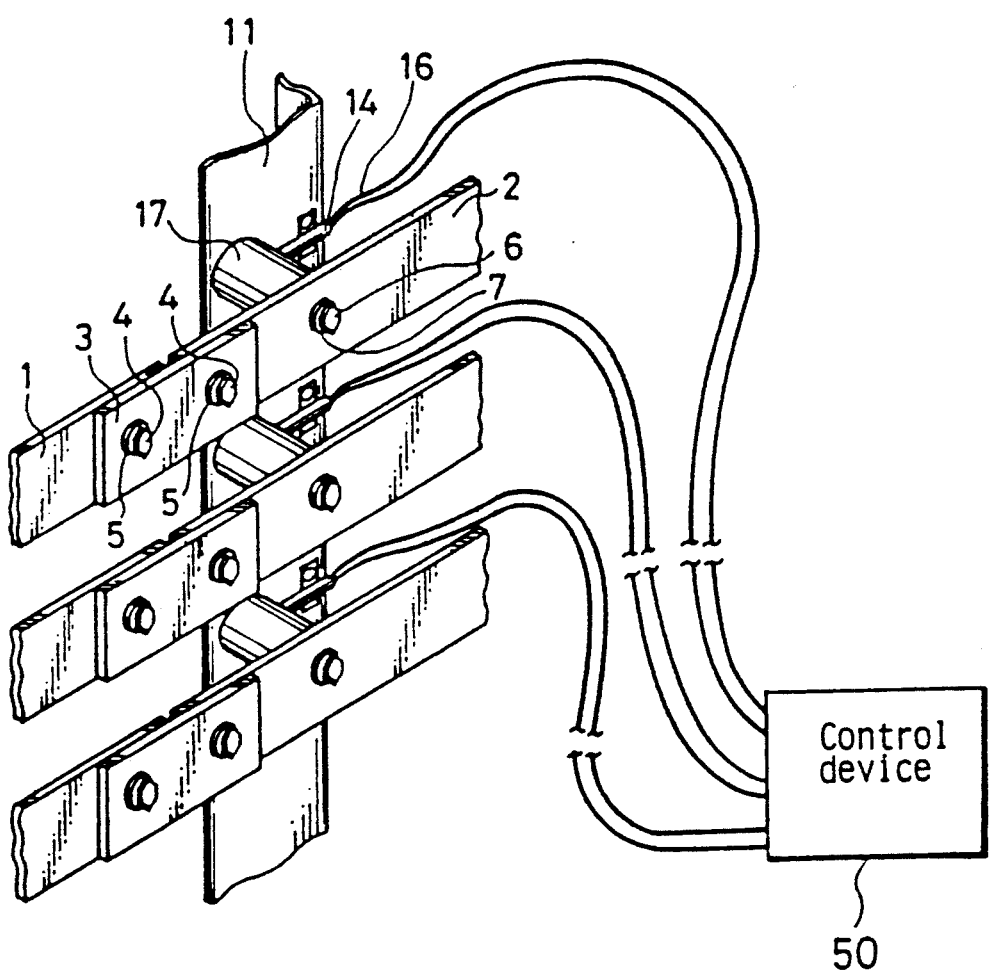
FIG. 2 is a perspective view showing a constitution of a second embodiment of an apparatus for surveillance of bus-bar temperature in accordance with the present invention.
Figure 3:
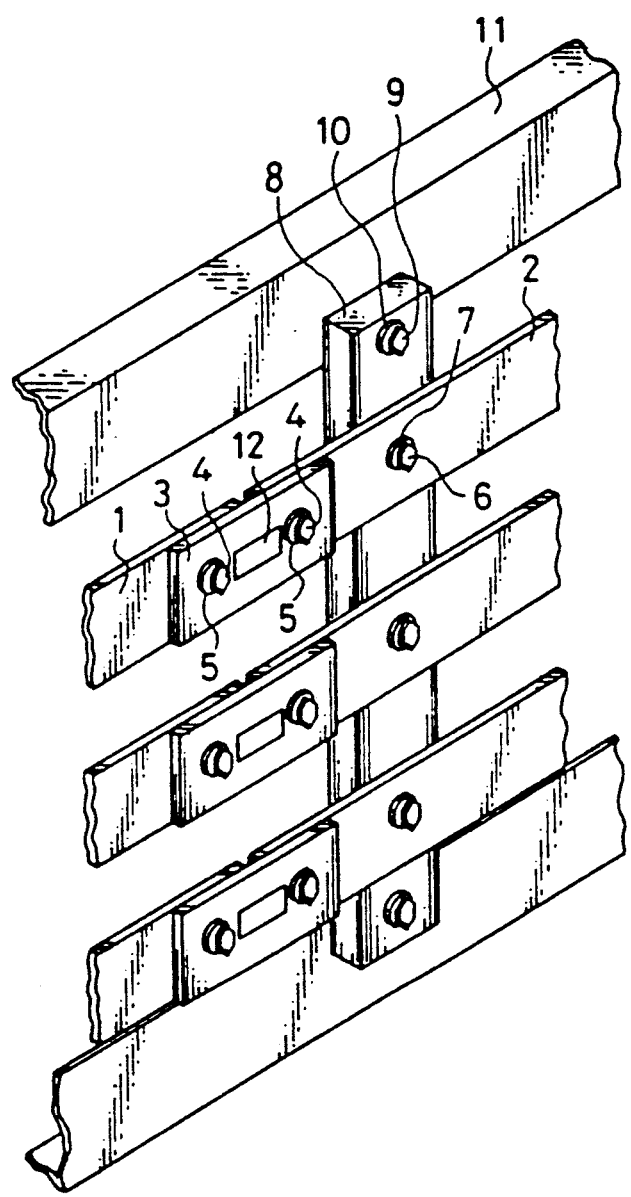
FIG. 3 is the perspective view showing the constitution of the conventional surveillance of the temperature of the bus-bar.

A second preferred embodiment of an apparatus for surveillance of bus-bar temperature in accordance with the present invention is described referring to FIG. 2. FIG. 2 is perspective view showing the constitution of the second embodiment. Elements designated by the same numerals in FIG. 1 are the same as the elements shown in FIG. 1 and the above-mentioned first embodiment. Therefore, the same description applies and duplicated explanation of such elements are omitted.

In the second embodiment shown in FIG. 2, individual insulative holders 17 for holding the bus-bars 2 are provided on respective phases. Namely, the bus-bars 2 are held by smaller insulative holders 17, respectively. The insulative holders 17 are also made of an insulative material having high heat conductivity such as ceramics, similarly to the first embodiment shown in FIG. 1. Furthermore, temperature sensors 14 are provided in the vicinity of respective insulative holders 17 in a manner so as to contact the insulative holders 17. The respective temperature sensors 14 are connected to the control device 50 which is provided remotely from the bus-bars 1 and 2 by the lead wires 16. The control device 50 compares signals outputted from the temperature sensors 14 with a predetermined reference value, respectively, or compares the changes of the signals with data of a predetermined characteristic curve stored in the memory, respectively. Accordingly, a connection part of the bus-bars, where the abnormal temperature rise has occurred or will occur in near future, can be specified in the second embodiment.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An apparatus for surveillance of bus-bar temperature comprising:
    at least one insulative holder having a high heat conductivity and provided in the vicinity of each bus-bar for electrically insulatively supporting bus-bars;
    a temperature sensor provided for contacting each said insulative holder and outputting a signal corresponding to the temperature of said insulative holder; and
    a surveillance means remotely provided from said temperature sensor, receiving said signal from said temperature sensor and judging whether said signal is normal or not.

2. An apparatus for surveillance of bus-bar temperature in accordance with claim 1, wherein
    said insulative holder and said temperature sensor are provided on bus-bars of respective phases; and
    said surveillance means specifies a phase where an abnormal temperature rise occurs or will occur in the near future.

* * * * *